United States Patent [19]
Moe

[11] Patent Number: 5,345,430
[45] Date of Patent: Sep. 6, 1994

[54] RECOVERY RECORDER SYSTEM, PARTICULARLY COMMERCIAL RADIO/TV BROADCAST RECOVERY RECORDER SYSTEM

[76] Inventor: Gordon Moe, 1600 Russell Rd., Alexandria, Va. 22301

[21] Appl. No.: 921,183

[22] Filed: Jul. 29, 1992

Related U.S. Application Data

[63] Continuation-in-part of Ser. No. 320,637, Mar. 8, 1989, abandoned, which is a continuation-in-part of Ser. No. 231,575, Aug. 12, 1988, abandoned.

[51] Int. Cl.[5] .......................... H04H 9/00; G11B 5/00
[52] U.S. Cl. .......................................... 369/7; 369/6; 360/7
[58] Field of Search .............. 369/7, 1, 6, 84, 85, 369/21; 360/7, 13, 15, 14.1; 300/1, 5

[56] References Cited

U.S. PATENT DOCUMENTS

| | | | |
|---|---|---|---|
| 3,812,530 | 5/1974 | Ikegami | 360/5 |
| 3,885,090 | 5/1975 | Rosenbaum | 360/7 |
| 4,460,928 | 7/1984 | Kishimoto | 360/4 |
| 4,602,297 | 7/1986 | Reese | 360/13 |
| 4,982,390 | 1/1991 | Tanaka | 360/7 |

Primary Examiner—Robert J. Pascal
Assistant Examiner—Tan Dinh
Attorney, Agent, or Firm—Jim Zegeer

[57] ABSTRACT

A recording device and method for recovering a portion of a commercial radio or TV broadcast immediately after listening to it. The device consists of a short term memory media which is used to continuously record the last few minutes of the program being monitored, a control logic module which upon command will cause the material on the short term storage media to be transferred to a long term storage media, and the long term storage media. A timer, or a marker on the short term storage media, is used to terminate the recovery process.

11 Claims, 6 Drawing Sheets

FIG.7
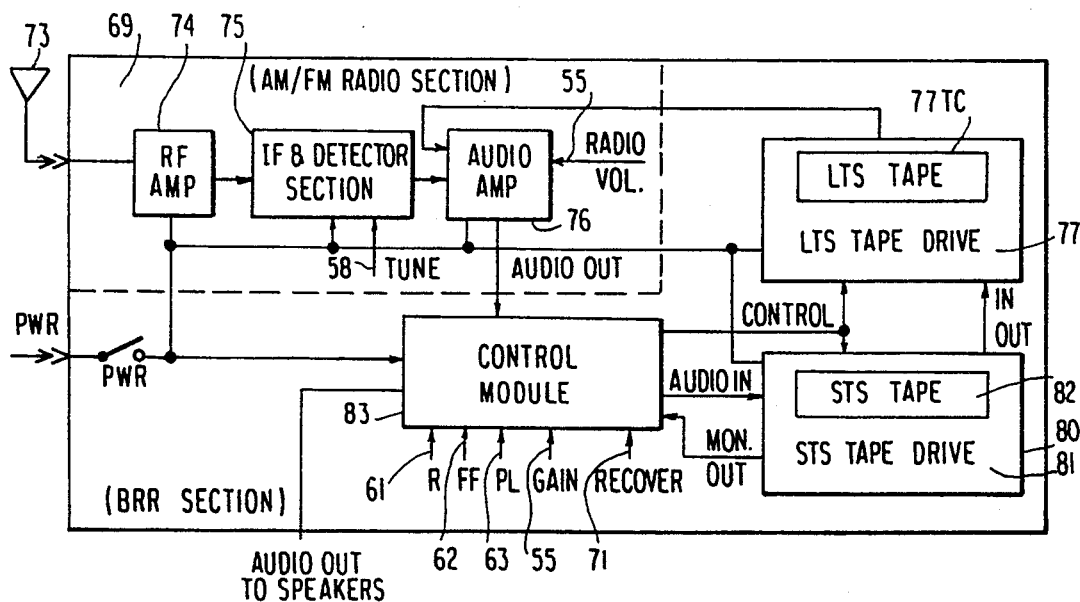
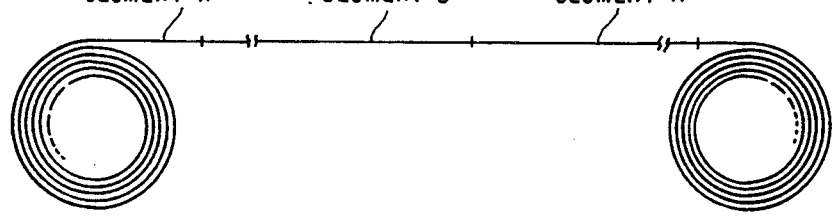
FIG.8
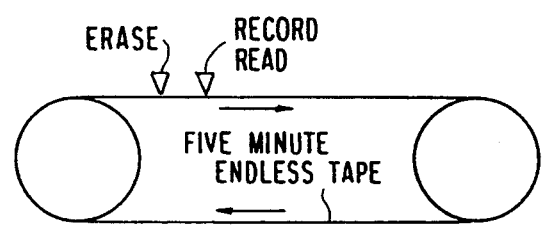
FIG.9

RECOVERY RECORDER SYSTEM, PARTICULARLY COMMERCIAL RADIO/TV BROADCAST RECOVERY RECORDER SYSTEM

REFERENCE TO RELATED APPLICATIONS

This application is a continuation-in-part of my U.S. application Ser. No. 07/320,637 filed Mar. 8, 1989 entitled "RECOVERY RECORDER SYSTEM, PARTICULARLY COMMERCIAL RADIO/TV BROADCAST RECOVERY RECORDER SYSTEM" and now abandoned, which is a continuation-in-part of my U.S. application Ser. No. 07/231,575 filed Aug. 12, 1988 entitled "AUDIO AND/OR VIDEO RECORDER SYSTEM FOR COMMERCIAL RADIO/TV BROADCAST IN WHICH SHORT SEGMENTS ARE RECORDED ON A SHORT TERM MEMORY WHICH RECORDS FOR PERMANENT USE A PLURALITY OF THE SHORT SEGMENT", now abandoned.

FIELD OF THE INVENTION

This invention relates to a device which permits continual monitoring and storage of the last several minutes of audio signal, or optionally, audio and video signal, and upon command from the user, copies the stored material or segment to a cassette tape or other storage media thereby "recovering" the previously transmitted material or segment for permanent retention or further editing and dubbing.

BACKGROUND OF THE INVENTION

Individuals spend a considerable amount of time listening to radio and TV in their automobiles, homes, and boats, as well as elsewhere with portable devices. Frequently the listener will hear or see a new tune, act, recitation, story, etc., which has sufficient appeal to the listener to cause the listener to think "I wish I had that on tape!" By then of course, the broadcast has moved on to other material or segment, and the content of interest is "lost forever". If the material or segment is a commercially available recording, such as a tune by some recognized artist, then of course the listener can purchase a copy at a later time. But in this case the listener must buy an entire album to obtain a copy of the one piece of interest. It is also an inconvenience to remember the particulars if a new artist is involved, as it is to have to make a shopping trip. If the broadcast is a live program, it can be very difficult to recover a copy later, and in many cases impossible.

One could accomplish the functions of this invention by using two commercially available tape recorders (or one with dual heads), one with a "continuous loop" tape which would serve as the monitor and short term storage media, and one with a regular blank recording tape to serve as long term storage. One could also simply record entire radio or TV programs, and select out desired sections for re-recording later. Neither of these techniques is very convenient, however, as both involve a cumbersome amount of equipment and time. While they are acceptable for home use, perhaps, (in fact the second alternative is regularly used in the home) the inconvenient arrangement generally prohibits their effective use in automobiles and portable situations. Even in the home the time involved in set-up, monitoring, and recopy limits the practice to special situations. A recovery recorder which was simply always monitoring any program observed would facilitate much more convenient and frequent use. No current model automobile audio cassette players are designed to record at all, and no current model portable audio cassette players (including those with dual cassette carriers) or home video recorders are designed to facilitate convenient (hands-off) continuous monitoring with short term storage and automatic transfer to long term storage.

SUMMARY OF THE INVENTION

An object of this invention is to provide a single integrated device with custom control logic and a user friendly control interface which will permit automated monitoring and short term storage of audio or audio and video, and automated transfer of selected portions to long term storage media with the push of a single button.

Another object is to provide a device and method of efficiently capturing a selection of commercial radio or TV programming after it has been heard and reviewed.

Another object is to provide a device and method of recording a selection of commercial radio programming in a moving vehicle without distracting the operator's attention from operating the vehicle.

Another object of the invention is to provide a device and method for continuously monitoring and recording a video or video and audio signal source on a short term memory or storage media and recovering the last predetermined minutes by transferring the predetermined minutes of audio signals stored in the short term memory to a long term storage or memory media.

In one embodiment, a recording device consisting of two separate media drives and a control logic unit which causes one media drive to continuously monitor and record the last several minutes worth of its input video and/or audio signal, until an operator "recover" command causes the monitoring to cease and the stored information to be recorded onto the second media drive for long term storage. Following the transfer, monitoring and recording of the input to the first media drive is automatically resumed. The long term storage media is then in position to store another input sequential to the first, upon receipt of a subsequent command. The long term storage media may be removed when filled to capacity and replaced with another blank recording media. In a preferred embodiment, a timer sets the duration of the recover interval. A control logic module monitors the timer and upon receipt of an end of time signal, removes power from the tape drive to discontinue playback and reapplies power to the short term storage drive to resume recording of the input audio or video signals. Alternatively, the recover command could cause a sub-audible marker to be placed on the short term storage media, which the control logic would later sense to terminate the recovery process. The invention can be configured to accommodate only audio signals, or both audio and video signals.

In a further preferred embodiment, instead of a short term tape storage, a solid state digital storage unit is used and delays the signals for a time period to enable the user to determine whether he or she desires to recover same and record for permanent use. In such case, after the listener hears the beginning of the piece and makes the decision to save a portion of the broadcast, can within the time period of the delay (15–20 seconds to several minutes), actuate a save selector so that the output of the delay is supplied to a D/A circuit and the analog audio recorder.

DESCRIPTION OF THE DRAWINGS

The above and other objects, advantages and features of the invention will become more apparent when considered with the following specification and accompanying drawings wherein:

FIG. 7 is a functional block diagram of the embodiment illustrated in FIG. 6, FIG. 8 is an example of a long term storage media tape cassette having sequential short segments A, B . . . N recorded thereon of equal length, FIG. 9 is an example of a short term storage media having an endless tape for continuously recording short periods of audio for transfer to the long term storage sequentially in segments A, B . . . N of FIG. 8.

Figure 1:
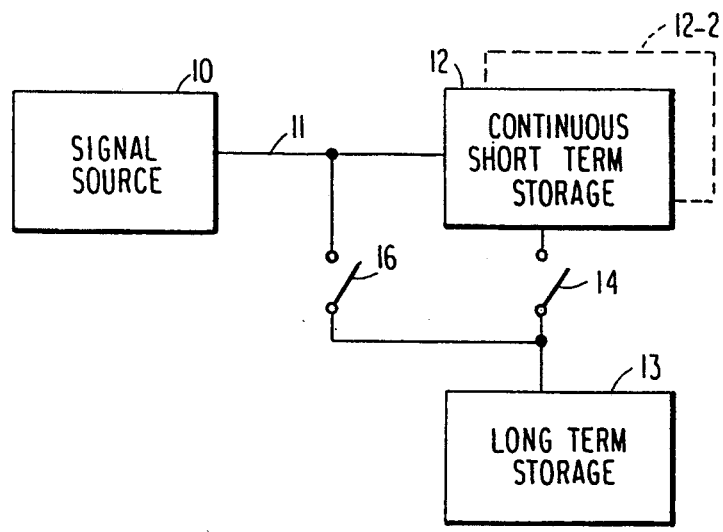
FIG. 1 is a block diagram illustrating the broader aspects of the invention, including the video option.

DETAILED DESCRIPTION OF THE INVENTION:

Referring now to FIG. 1, in its broader aspects the invention includes a video and/or audio source 10, which may be a broadcast receiver. If the signal source is provided with a conventional female ear phone jack, a corresponding complementary male plug is also provided. The line 11 is indicative of video and/or audio, and stereo or monophonic reception. Output signals are typically analog, but they can obviously be digital from digital recordings which have been broadcast. If the material or segment to be recorded is a lecture, or a speech, etc., the signal source 10 is a simple video camera and/or microphone-amplifier unit.

These signals are supplied to short term storage or memory 12 and short segments of video and/or audio signal, are continuously recorded. For example, short term storage 12 may be an endless tape in a cassette for storing 3–5 minutes of broadcast signals, such as music and the like. Alternatively, short term memory 12 can be one or more solid state RAM chips, in which case, any analog signals are converted to digital for storage purposes. Since the broadcast signals are continuously recorded, all previous recordings are erased as the new material or segment is recorded with the first in being erased first and each portion in sequence thereafter.

Long term memory 13 is, in this embodiment, a conventional tape cassette recorder drive for receiving monophonic or stereophonic signals from short term memory 12 via switch 14. However, it can be an optical or digital memory, if desired. If both video and audio are desired, then clearly both short and long term storage mediums and drives must be capable of storing both audio and video signals, e.g. VCR cassettes and drives.

In use with a radio receiver audio signal constituting source 10 on, signals are received, amplified, demodulated, etc., and supplied to short term memory 12 where they are continuously recorded. When the user hears a piece of music, for example, that he wishes to save, he waits until the tune or number is over and then actuates recover switch 14. This converts the short term memory to a play-back mode and its recorded signals are supplied to long term memory 13. After the transfer is completed to the long term memory or storage, the short term memory or storage is automatically reset to resume continuously erasing-recording for the new material or segment. The predetermined length of these short segments of recorded material or segment can be from about 3 to 15 minutes and preferably about 5 minutes. If a continuous loop tape is used, duration of the segments can be selected by the length of the tape inserted. If a solid-state memory is employed, the duration or the segments could be selected electronically by the user.

If the user knows in advance that the material or segment he or she wishes to record and save is longer than 5 minutes for the short term memory, he or she can operate switch 16 to connect and initiate operation of the long term memory 13 and thereby by-pass the short term memory. When switch 16 is operated, the system operates as a conventional tape recorder.

Figure 2:
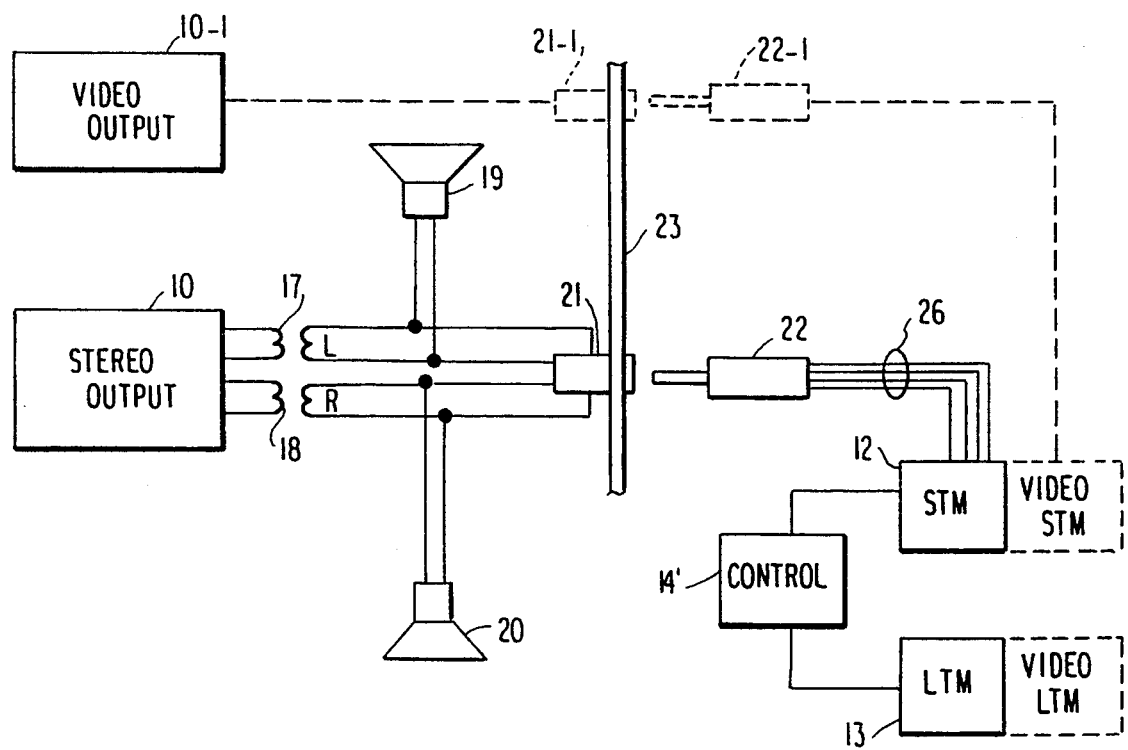
FIG. 2 is a schematic block diagram illustrating the simple connection to the stereo output jack of a radio receiver, or video and audio jacks of a TV receiver or VCR.

As shown in FIG. 2, the shielded stereo outputs 17, 18 of a radio stereo output 10 leading to a pair of loud speakers 19, 20 are electrically connected to a stereophonic jack 21 which is diagrammatically illustrated as being on the front of the instrument panel 23 of an automobile or other vehicle. A stereo phone plug 22 plugs into jack 21 and has shielded lead wires 26 coupling the signals to short term storage 12 which is continuously recording music or other material or segment which has been broadcast. Optionally, a TV or VCR video output 10-1 could be included via jack 21-1 and plug 22 to the short term storage 12, which would be upgraded to be capable of storing video signals. When the user hears (or sees) a piece he wishes to save, he waits until the end of the piece and then operates control 14' to turn on long term memory or storage 13 and initiate the transfer of the material or segment from the short term memory. After the material or segment stored in short term memory 12 has been completely transferred to long term memory 13, the short term memory 12 automatically is switches to begin continuous monitoring and recording a further 5 minute segment. When the user decides to select for permanent storage a further 5 minute segment of music or speech dialog, he again actuates the recover switch.

In the event the next succeeding tune or event is one the user would like to record, he would not be able to accomplish that because the short term memory is busy down-loading the previous 5 minute segment. However, one would not go beyond the scope of the invention by providing a second short term memory that is enabled when the first is being down-loaded to the long term memory, indicated as dotted rectangle 12-2 in FIG. 1. This is especially economical if the short term memory is constituted by solid-state memory chips in the form of a random access memory (RAM).

Figure 3:
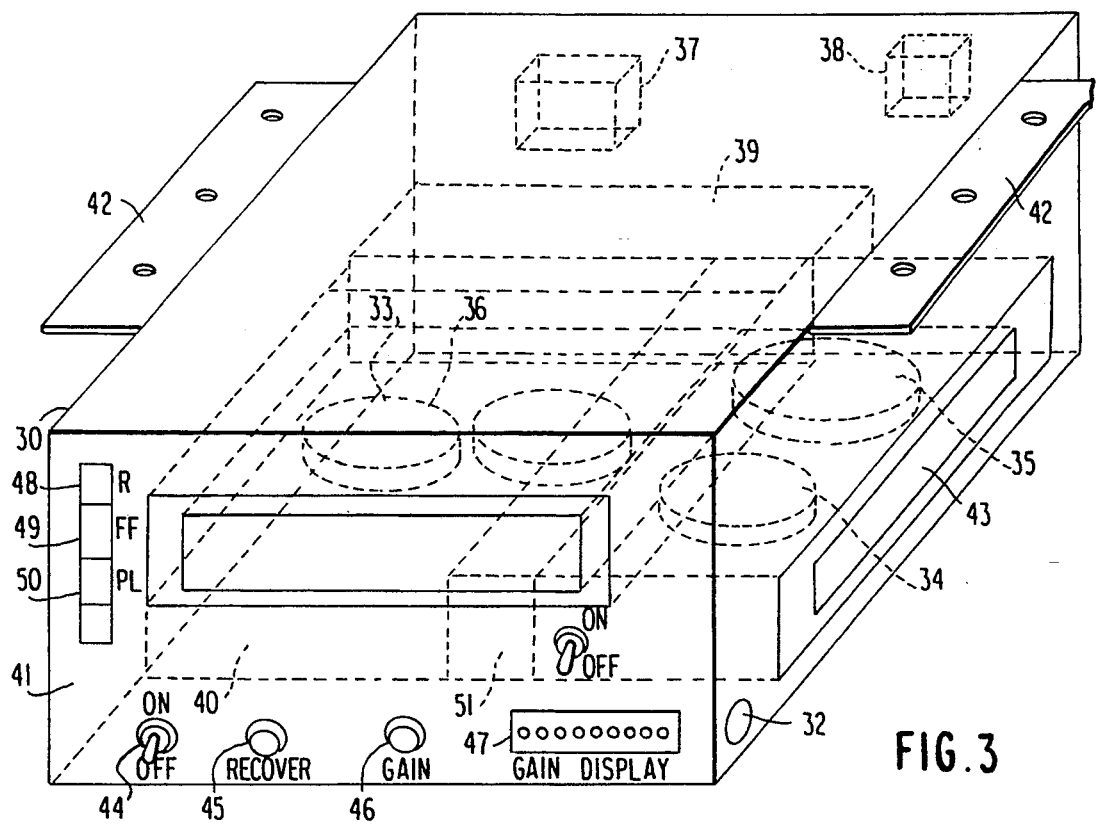
FIG. 3 is an exploded perspective mechanical view of the invention showing the physical configuration of one embodiment appropriate for audio use in an automobile, or video/audio use with home TV/VCR.

FIG. 3 shows the housing 30 containing two magnetic tape drives 33 and 34 as one embodiment of the storage media, a continuous loop tape 35 as the short term storage media on drive 33, a magnetic cassette tape 36 as the long term storage media on drive 34, the input connector 37, power connector 38, the power supply module 39, the control logic module 40, and the operator control panel 41. The cassette tapes and drives can be either audio for audio only, or VCR type for both audio and video. Mounting brackets 42 are shown for a version of the invention configured for mounting beneath an automobile dashboard. The device can also be packaged as a self contained portable unit, for in-dash mounting, or for shelf or equipment rack mounting. Both tape drives 33 and 34 are controlled electrically or electromechanically to facilitate "one button" automatic operation. The short term storage (STS) tape 35 is accessible via a small removable hatch 43 to permit infrequent replacement of worn continuous loop tapes. Of course, this will not be necessary when the short term storage or memory is in the form of solid-state electronic circuitry.

The long term storage (LTS) tape 36 is contained in a normal auto load-eject type cassette. The controls are simple and few, consisting of an on/off switch 44 which initializes the units logic and initiates the monitor and record functions, a "recover" button 45 which causes transfer of stored data from the STS cassette 35 to the LTS cassette 36, and an input gain knob 46, which adjusts the sensitivity of the device. A conventional set of green and red lights on the panel 47 (or a meter needle) display actual gain. Optional controls shown are rewind 48, fast forward 49, and play 50 switches to provide these respective functions for the LTS tape drive 33. A monitor selector 51 could also be added to permit the operator to hear (view) the audio (video) input as received by the LTS tape 36. These options would add convenience but are not necessary.

Figure 4:
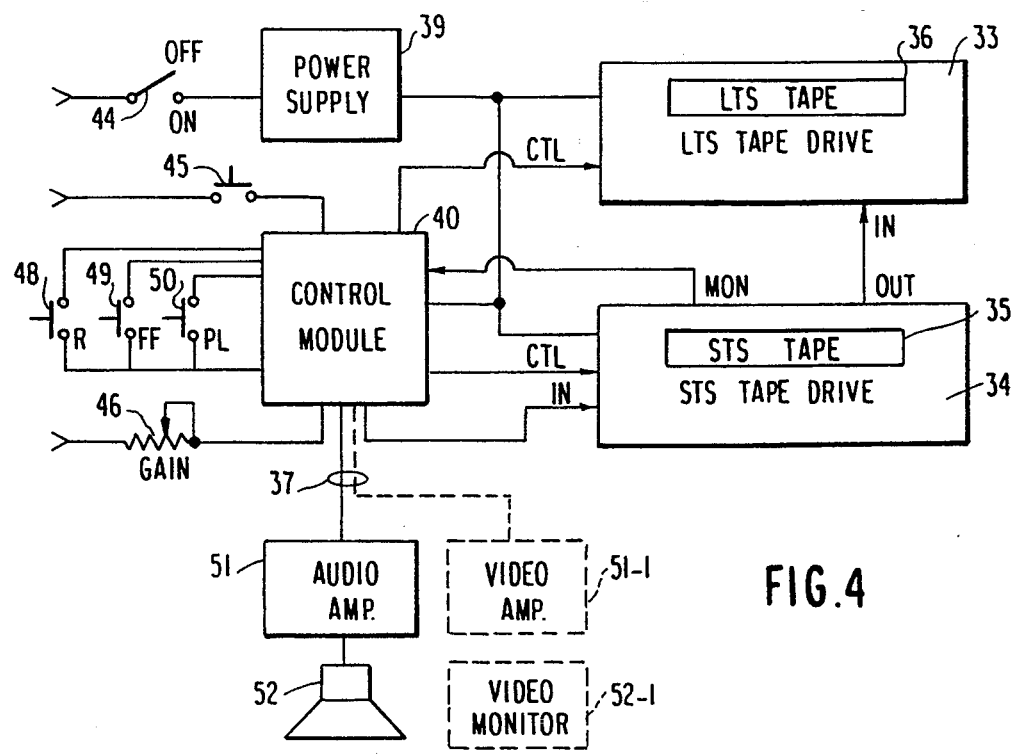
FIG. 4 is a functional block diagram of the invention showing the electrical sub-systems and their interaction, which also applies to either audio or video and audio version, FIG. 5 schematically shows the control logic module in greater schematic detail, including the video option.
Figure 5:
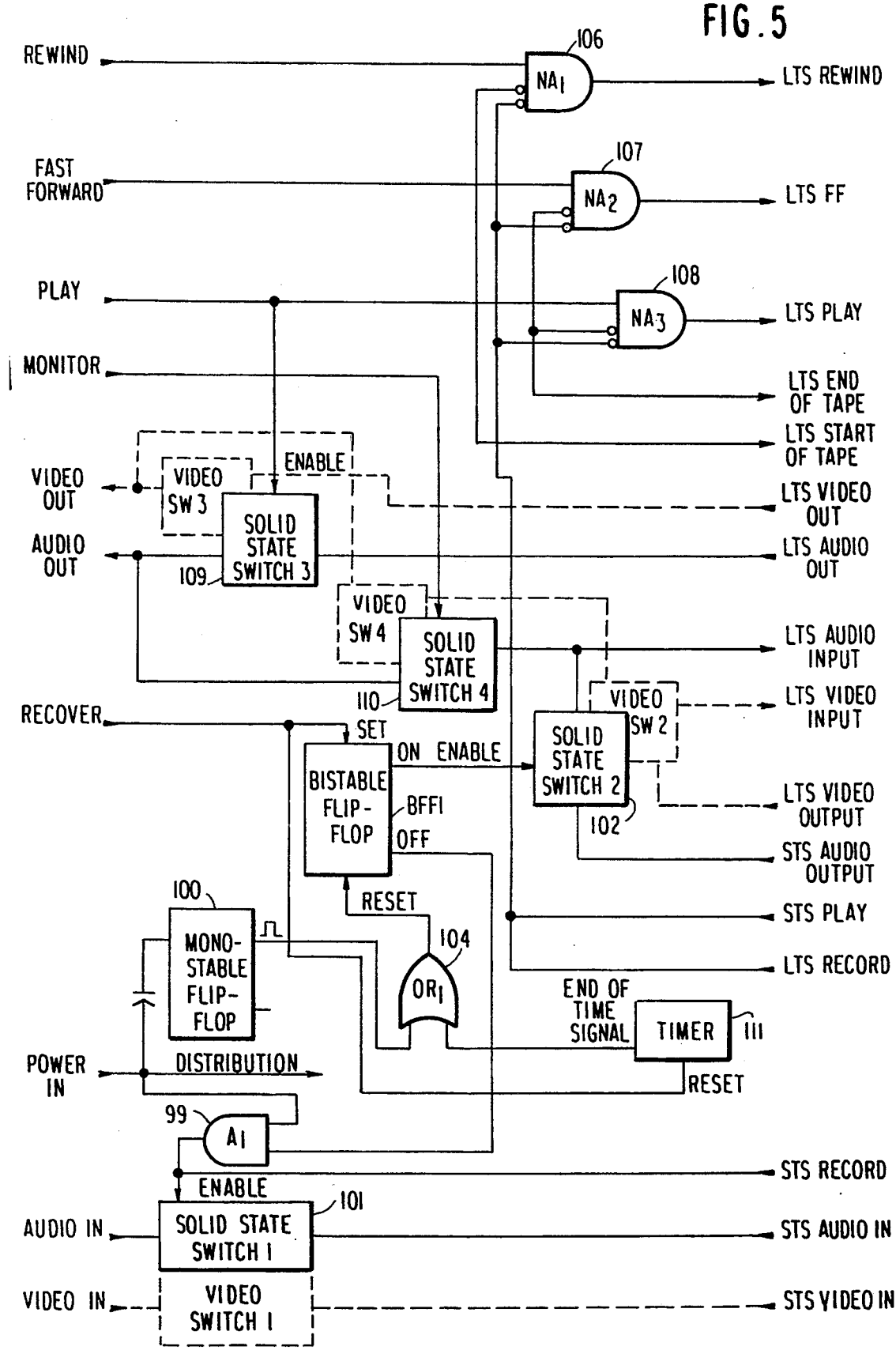

The functional block diagram of FIGS. 4 and 5 illustrate the control logic and operating process. The dashed portions show augmentation included for video capabilities. When power is applied by the on/off switch 44, the control logic module 40 applies power to the STS tape drive 34, causing it to begin recording the audio (video/audio) signal available at the input cable 37. The only adjustment necessary is the audio input gain control 46, which is rotated clockwise until the panel gain display lights show mostly green and only occasional red. As described later herein, when a signal pulse is received from the "recover" button 45, the control logic module 40 removes power from the STS tape drive 34 to cease or terminate recording, applies power to the LTS tape drive 33 to begin recording, and to the playback portion of STS tape drive 34 to cause it to play back it's stored contents to the LTS tape drive 33. Since in this embodiment the short term storage tape is endless, it does not have to be rewound for playback. The control logic module 40 resets and monitors timer 11 which sets the duration of the recover interval and upon receipt of the end-of-time signal removes power from the lts tape drive 33 to discontinue recording, removes power from the playback portion of STS tape drive 34 to discontinue playback, and reapplies power to the record portion of STS tape drive 34 to cause it to resume recording of the input audio signal. (An acceptable alternative to timer III would be for the recovery command to place a sub-audible tone marker on the short term storage tape, and the control logic to sense this marker to terminate the recovery function). Switching the on/off switch to off causes power to be removed from all modules.

The optional controls and features are also shown in FIGS. 4 and 5. The rewind switch 48 causes the control logic module 40 to apply power to the rewind motor of the LTS tape drive 33 which in turn causes it to rewind LTS tape 36. The tape rewinds as long as the rewind switch 48 is depressed, or until it is fully rewound. The control logic module 40 senses when the tape is fully rewound, and removes drive power. The fast-forward switch 49 applies power to the high speed input on the LTS tape drive 33, causing it to advance at high speed as long as the fast-forward switch 49 is depressed or until the end of the tape is reached, at which time the control logic module 40 removes power. The play selector 50 supplies power to the LTS tape drive playback section, causing it to play back the content of the LTS tape 36 via an audio (video/audio) amplifier 51 (51-1) and speaker (monitor 52-1) 52. The control logic module 40 inhibits use of rewind, fast-forward, and play functions during a "recover" operation as described above.

The control logic module block diagram in FIG. 5 illustrates the control process. When power is first applied, a monostable flip-flop 100 is triggered, causing a system reset pulse to be sent through OR gate 104 to initialize the bistable flip-flop BFF1 in its "off" state. The BFF1 "off" signal together with presence of power cause AND gate 99 to signal the STS drive to begin recording, and to enable solid state switch 101 to pass audio (video/audio) input to the STS drive. This state continues until power is removed or a recover command is received. A recover signal sets BFF1 to its "on" state. Removal of the BFF1 "off" signal disconnects audio (video/audio) from the STS drive (via solid state switch 101) and removes the record command from the STS drive. Presence of the BFF1 "on" signal presents a record command to the LTS drive, a play command to the STS drive, and an enable signal to solid state switch 102, which switches audio (video/audio) output from the STS drive to the LTS drive input. When OR gate 104 senses an end-of-time signal from timer 111, it sends a reset signal to BFF1, returning the system to its monitoring mode. Control of the rewind, fast forward, and play commands for the LTS drive are controlled by NAND gates 106, 107, and 108. So long as they are not inhibited by a recover process underway signal (from BFF1 on) or the relevant LTS tape position signal, they will pass the command on to the LTS tape drive. The play command also switches LTS audio (video/audio) output to the audio (video/audio) output port(s) via solid state switch(es) 109. The monitor command enables solid state switch(es) 110, which connects STS audio (video/audio) output to the output port(s). Although a single line is shown for the audio (video/audio) signals, it will be appreciated that the number of actual lines are sufficient to cover video and/or audio monophonic, stereophonic, etc. recording. It will be appreciated that the control logic module functions and improvements thereon can be performed by a single chip microprocessor.

Figure 6:
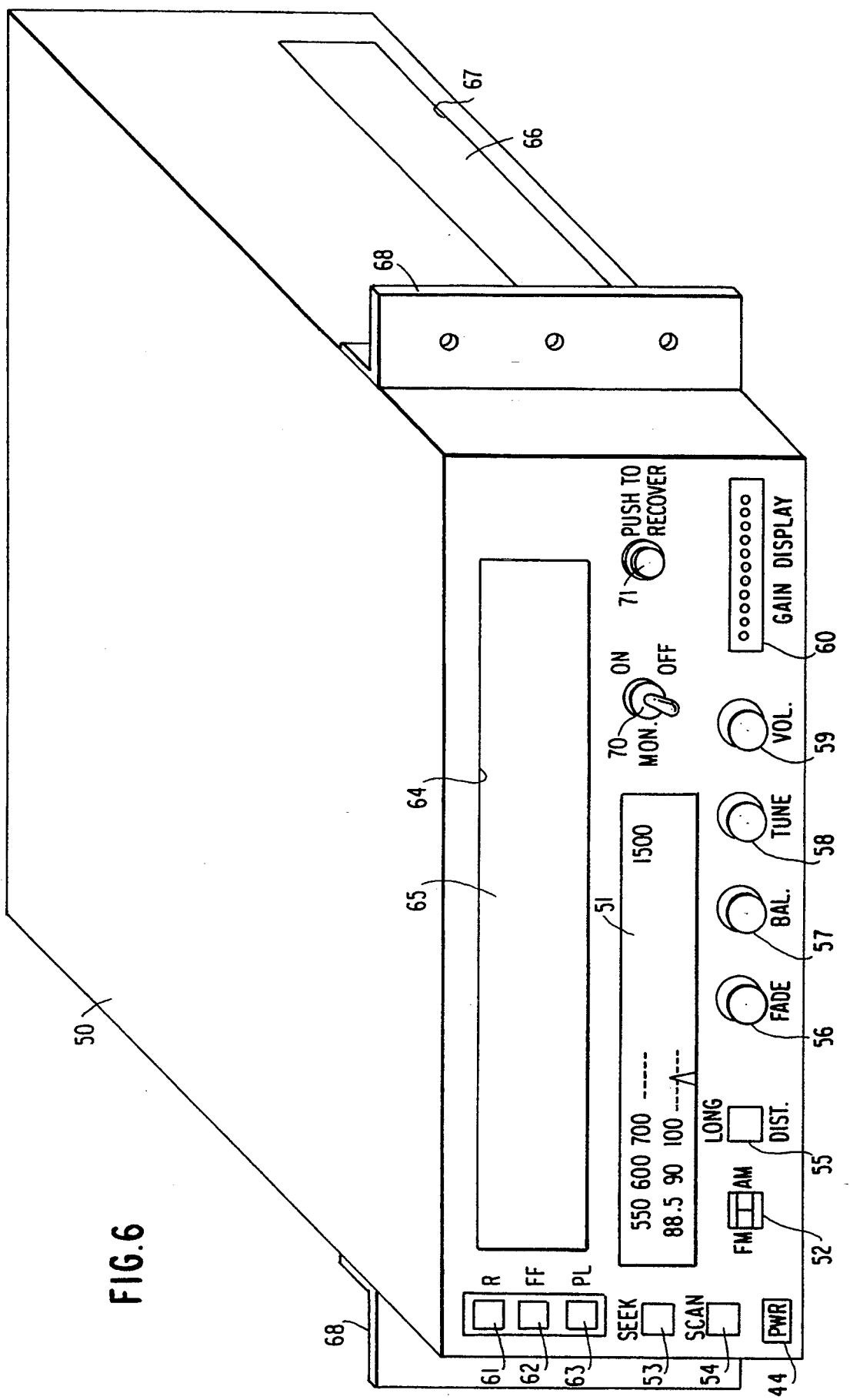
FIG. 6 is a perspective mechanical view of a further embodiment of an audio version the invention, integrated with an automobile in-dash AM/FM stereo/cassette system.

Referring now to FIGS. 6 and 7, the broadcast receiver recorder, according to this embodiment of the invention, is integrated with an automobile AM/FM stereo radio receiver and cassette unit 50. In this embodiment the conventional AM/FM stereo radio controls (analog or digital display 51, AM/FM select 52, seek 53, scan 54, long distance 55, fade 56, balance 57, tune 58 (with associated tone controls), gain and/or volume control 59 (and associated on/off switching and gain display 60), and conventional tape deck controls, reverse (R) 61, fast-forward (FF) 62, and "play " (PL) 63) are provided. A conventional tape insert slot 64 protected by hinged door 65 receives standard cassettes for playing in the normal manner, or blank tape cassettes which serve as a long term storage medium. A second tape input door 66 protects slot 67 for receiving a short term memory tape. Mounting brackets 68 are secured to the sidewalls of housing AM/FM stereo radio receiver and cassette unit 50.

In addition to the conventional AM/FM stereo radio controls, an "on/off" monitor switch 70 and a push to recover switch 71 which controls initiates the transfer of material or segments recorded in the short term memory to the long term memory.

As shown in FIG. 7, an antenna 73 supplies broadcast signals to an AM/FM radio section 69 having an RF amplifier 74, IF and detector section 75 an audio amplifier 76 which drives speakers (not shown in this figure). Long term storage tape drive 77 receives conventional tape cassettes 77TC via slot 64, reads the tape and supplies a audio signal to audio amplifier 76 in a conventional playback fashion. It will be appreciated that a separate audio amplifier could, if desired, be used for this purpose.

Short term storage 80 incorporates a tape drive 81 which receives short term storage tape 82 which is an endless tape for recording. Control module 83 is generally similar to the control module shown in FIG. 5.

Figure 10:
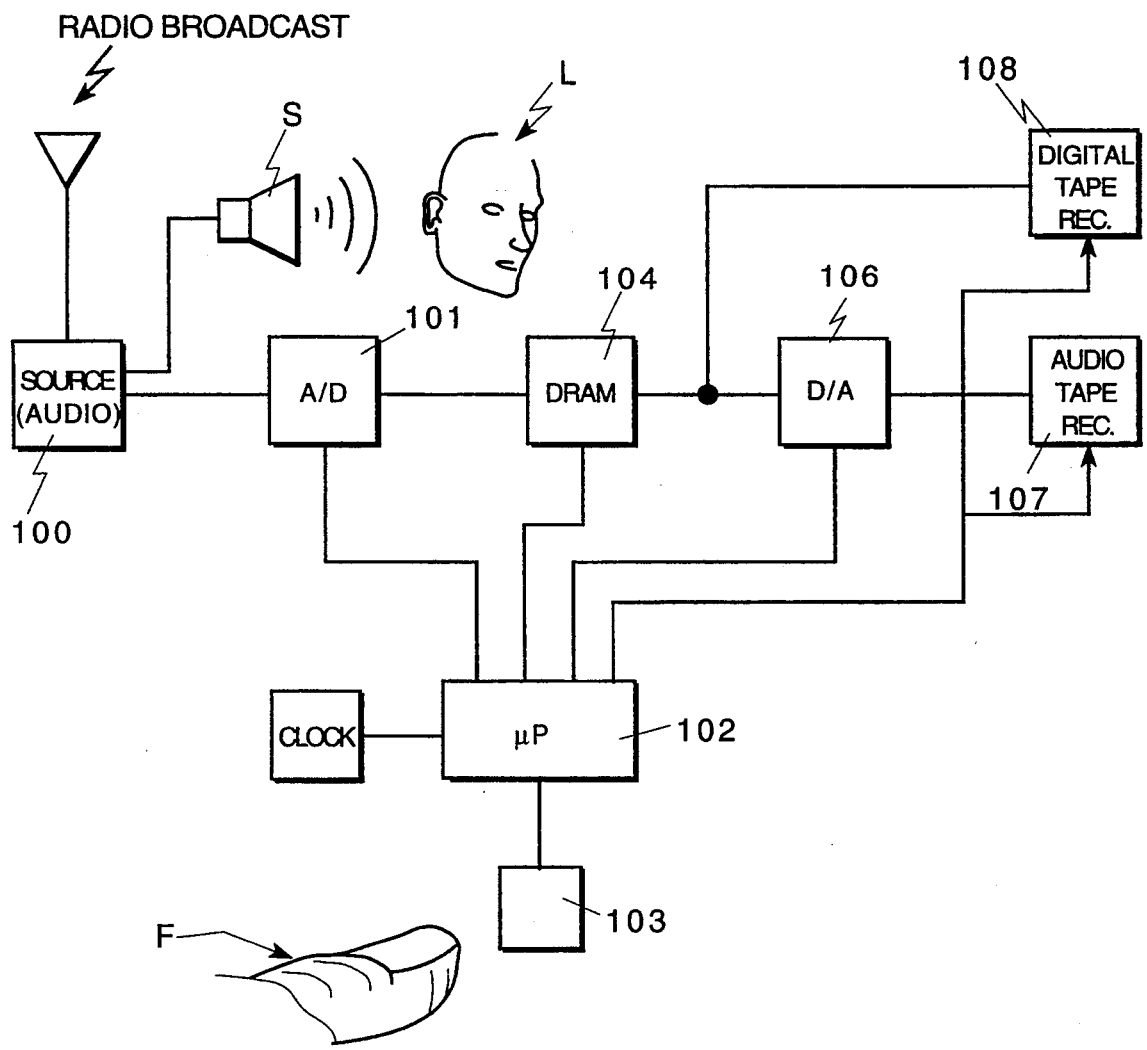
FIG. 10 is a block diagram of a further preferred embodiment.

In a further preferred embodiment shown in FIG. 10, the source 100, which in this embodiment is audio (monaural or stereo, with one channel for each side), but could be video, receives a radio broadcast and supplies analog audio signals to analog-to-digital converter 101, which is controlled by microprocessor 102 to convert all audio analog signals to digital signals. All digital audio signals from A/D converter 101 are supplied to a time delay circuit constituted by a dynamic random access memory 104 (which could alternately be a FIFO memory) controlled by microprocessor 102. Dynamic random access memory 104 is preferably of a size such that the reaction time of the listener L from when the listener hears some audio from speaker S to when he decides to recover same and the user's finger F depresses the "save" or "record" switch 103. This can be a few seconds to several minutes. Thus, the sound signal heard earlier by the listener L will emerge later from the time delay DRAM 104 from the few seconds to the several minutes storage time of the DRAM 104.

In the preferred embodiment, digital signals are passed through digital-to-analog converter 106 to provide analog audio signals which are recorded on a conventional low cost cassette in tape recorder 107, which is also controlled by microprocessor 102. Alternatively, the digital signals from DRAM 104 can be supplied to a digital audio tape recorder 108 for recording in digital format.

At the end of the piece selected for recording, the user again actuates the record switch 103 to cause microprocessor to terminate sending of signals therefrom. While digital signals are continually being produced by the A/D converter 101 and supplied to and stored in DRAM 104, the tape recorder is not activated by the microprocessor so the further signals are not recorded. This arrangement preserves the safety features of the previous embodiments and, at the same time, there is no constraint on the overall length of the segment to be recorded in an uninterrupted fashion and is more adaptable to vehicles since it does not take up much under-dash space and can be easily added to current vehicle tape recorder decks at relatively low cost.

While preferred embodiments of the invention have been shown and described, it will be appreciated that various modifications and adaptations of the invention will be readily apparent to those skilled in the art and embody the spirit and scope of the invention.

What is claimed is:

1. A device for recording the last 3–15 minutes of an audio source:
   1) means for continually monitoring said audio source,
   2) a plurality of short term memory media,
   3) means for continually recording said minutes of said source on one of said short term storage memory media, said plurality of short term storage memory media,
   4) long term storage media, and
   5) means for terminating recording on one of said short term storage memory media and transferring the contents thereof to said long term storage media upon command, said means for terminating including means for recording a marker signal in said short term memory means, and control logic means for sensing said marker signal and terminating transfer of said contents to said long term storage media.

2. The device of claim 1 wherein said minutes is about 5 minutes.

3. A method for recovering the last few minutes of an audio source signals comprising:
   1) continually monitoring said audio source signals,
   2) providing a first and a second short term memory means,
   3) continually storing a sequential predetermined number of minutes of said audio source signals, sequentially on said first and then said second short term storage means, respectively and a marker signal following said predetermined number of minutes,
   4) providing a long term storage means,
   5) transferring a selected one of said short term memory means contents to said long term storage means upon command,
   6) terminating said transfer upon receipt of said marker signal.

4. A recorder system comprising:
   means of forming a source of a selected audio one of an audio or video signal,
   a short term memory means having a predetermined relatively short recording period,
   a long term memory means having a plurality of said predetermined relatively short recording periods arranged in sequence therealong,
   means for connecting said short term memory means to said source of a selected one of an audio or video signal to continuously record segments from said source of audio or video signals,
   means for disconnecting said short term memory means from said selected one of an audio or video signals and causing a transfer of segments recorded in said short term memory means to said long term memory means for recording on said long term memory means, and including means for setting the duration of transfer of a segment recorded on said short term memory means to said long term memory means and resuming continuously recording of said selected one audio or video segment and wherein said means for setting the duration of transfer includes a means for recording a marker signal on the short term memory means, and control logic means for sensing said marker signal and terminate transfer of one of said segments recorded on said short term memory means to said long term memory means.

5. A device for recording the last 3–15 minutes of an audio source:
1) means for continually monitoring said audio source,
2) means for continually recording said minutes of said source on a short term storage memory media, and
3) recovery means for terminating recording on said short term storage and transferring the contents to a long term storage media upon command, and means for setting the duration of recovery to discontinue recording on said long term storage media and thereafter resuming said continuous recording on said short term storage memory media and wherein sid means for setting the duration of recovery includes means for recording a marker signal on said short term storage memory and control logic means for recognizing said marker signal.

6. Apparatus for recording short segments of a TV broadcast wherein:
a short term continuously recording storage means for recording segments of said TV broadcast,
a long term video recording storage means which is normally inactive,
manual switch means for initiating active operation of said long term recording storage means and playback operation of said short term continuously recording means to selectively transfer the contents of selected segments of said TV broadcast to said long term recording storage means for a predetermined period of time, and an electronic timer initiated upon operation of said manual switch means for establishing said predetermined time period.

7. A device for recording selections from a radio broadcast audio signal:
1) monitor means for continually monitoring said radio broadcast audio signal and reproducing an analog audio signal corresponding thereto, a loud speaker means connected to said monitor means for reproducing an audio rendition of said radio broadcast audio signal for a listener;
2) analog-to-digital converter connected to said monitor means for converting said analog signal to digital signal;
3) digital delay means for delaying all of said digital signal in a predetermined interval;
4) a cassette tape recorder;
5) microprocessor means for selectively connecting said digital delay means to said tape recorder and transferring the contents thereof to said cassette tape recorder upon command, and selectively disconnecting said digital delay means from said cassette tape recorder, and a manual control member connected to said microprocessor for controlling the connection and disconnection of said digital delay means to said cassette tape recorder;
said monitor means further includes a vehicle radio and said manual control member is located for easy access without distracting the operator's attention from operating the vehicle;
said predetermined time interval being of a size as to permit said listener to actuate said manual control member before the sound signal heard earlier by said listener emerges from said digital delay means and be recorded by said cassette tape recorder.

8. The device defined in claim 7 wherein said cassette recorder is an analog recorder and including digital-to-analog converter means connected between said digital delay means and said analog recorder.

9. The device defined in claim 7 wherein said predetermined time interval is from about 15 seconds to about 2 minutes.

10. The device defined in claim 7 wherein said digital delay means includes a dynamic random access memory.

11. The device defined in claim 7 wherein said digital delay means includes a FIFO memory element.

* * * * *